United States Patent
Lin et al.

(10) Patent No.: US 12,399,061 B2
(45) Date of Patent: Aug. 26, 2025

(54) OPTICAL COMPONENT AND SYSTEM FOR SIMULTANEOUS 3D HYPERSPECTRAL IMAGING

(71) Applicants: Haosheng Lin, Kula, HI (US); Morgan B. Bonnet, Honolulu, HI (US)

(72) Inventors: Haosheng Lin, Kula, HI (US); Morgan B. Bonnet, Honolulu, HI (US)

(73) Assignee: UNIVERSITY OF HAWAII, Honolulu, HI (US)

( * ) Notice: Subject to any disclaimer, the term of this patent is extended or adjusted under 35 U.S.C. 154(b) by 83 days.

(21) Appl. No.: 18/224,594

(22) Filed: Jul. 21, 2023

(65) Prior Publication Data

US 2024/0027265 A1    Jan. 25, 2024

Related U.S. Application Data (60) Provisional application No. 63/391,107, filed on Jul. 21, 2022.

(51) Int. Cl.
*G01J 3/02* (2006.01)
*G01J 3/18* (2006.01)
(Continued)

(52) U.S. Cl.
CPC ............ *G01J 3/021* (2013.01); *G01J 3/2803* (2013.01); *G01J 3/2823* (2013.01);
(Continued)

(58) Field of Classification Search
CPC ........ G01J 3/021; G01J 3/2803; G01J 3/2823; G01J 2003/2826; G01J 3/0208;
(Continued)

(56) References Cited

U.S. PATENT DOCUMENTS

| | | | | |
|---|---|---|---|---|
| 5,420,681 A | * | 5/1995 | Woodruff | G01J 3/2823 356/326 |
| 2008/0024871 A1 | | 1/2008 | Achal et al. | |

(Continued)

FOREIGN PATENT DOCUMENTS

EP         2474817 A1 *  7/2012  ............... G01J 3/02

OTHER PUBLICATIONS

International Search Report and Written Opinion issued Jan. 18, 2024, in corresponding International Application No. PCT/US23/28324, 12 pages.

(Continued)

*Primary Examiner* — Tarifur R Chowdhury
*Assistant Examiner* — Kaitlyn E Kidwell
(74) *Attorney, Agent, or Firm* — XSENSUS LLP (57) ABSTRACT

A compact structure for snapshot hyperspectral imaging may include an image slicer, an integral field unit, an integral field spectrograph, and multiplexed integral field spectrograph. The image slicer includes a first section having a first plurality of mirrors, each mirror of the first plurality of mirrors having a predetermined tilt in a longitudinal direction, a second section having a second plurality of mirrors, each mirror of the second plurality of mirrors having a predetermined tilt in the longitudinal direction, and a ridge extending laterally between the first section and the second, the first section being at a first angle relative to the ridge and the second section being at a second angle opposite to the first angle relative to the ridge. The integral field unit source includes a four mirror design including an image slicer. The integral field spectrograph includes an array of spectrographs and an image slicer.

15 Claims, 8 Drawing Sheets

(51) Int. Cl.
  *G01J 3/28* (2006.01)
  *G02B 13/22* (2006.01)
  *G02B 17/00* (2006.01)

(52) U.S. Cl.
  CPC .......... *G02B 17/008* (2013.01); *G01J 3/0208* (2013.01); *G01J 3/0291* (2013.01); *G01J 3/0294* (2013.01); *G01J 3/18* (2013.01); *G01J 2003/2826* (2013.01); *G02B 13/22* (2013.01)

(58) Field of Classification Search
  CPC .......... G01J 3/0291; G01J 3/0294; G01J 3/18; G02B 17/008; G02B 13/22
  See application file for complete search history.

(56) References Cited

U.S. PATENT DOCUMENTS

| | | |
|---|---|---|
| 2012/0218548 A1 | 8/2012 | Bodkin |
| 2017/0268927 A1* | 9/2017 | Beardsley ............ G02B 5/1842 |
| 2018/0094977 A1* | 4/2018 | Taccola .................... G01J 3/26 |
| 2019/0155007 A1 | 5/2019 | Steever et al. |
| 2020/0158568 A1 | 5/2020 | Kasim et al. |
| 2020/0348176 A1* | 11/2020 | Faraji-Dana .......... G01J 3/1804 |
| 2021/0131869 A1* | 5/2021 | Rolland-Thompson .................... G01J 3/2803 |
| 2022/0113192 A1 | 4/2022 | Prel et al. |

OTHER PUBLICATIONS

International Preliminary Report on Patentability issued Dec. 18, 2024, in corresponding International Patent Application No. PCT/US2023/028324, 8pp.

* cited by examiner

OPTICAL COMPONENT AND SYSTEM FOR SIMULTANEOUS 3D HYPERSPECTRAL IMAGING

CROSS-REFERENCE TO RELATED APPLICATION

The present application claims priority to Provisional Ser. No. 63/391,107 filed on Jul. 21, 2022, the contents of which are incorporated in its entirety.

GOVERNMENT RIGHTS

This invention was made with government support under 1727095 awarded by the National Science Foundation. The government has certain rights in the invention.

BACKGROUND

Field

The present disclosure relates to optical components and systems for simultaneous, real-time 3-dimensional (two spatial [x,y] and one spectral [lambda]) hyperspectral imaging of a 2-dimensional spatial field.

Description of the Related Art

In many areas of business and science, cameras are used which, in addition to a spatial resolution, have a spectral resolution that often goes beyond the red, green, and blue bands that human eyes can perceive. Spectrally high-resolution imaging technology, which is referred to as "hyperspectral imaging", has been developed for these measurements. This hyperspectral imaging allows, for example, recognition and differentiation of different chemical elements based on the spatially resolved spectrum.

Early hyperspectral imaging systems based on long-slit diffraction grating (or any dispersive elements such as prisms) spectrograph used a so-called "push broom" scanning, in which one dimension is used for a spatial determination and the other dimension for a spectral determination on a two-dimensional image sensor. New approaches in hyperspectral imaging and the development of higher-resolution sensors and computer hardware have made snapshot full-frame hyperspectral systems possible.

Conventional hyperspectral imagers, also known as Integral Field Spectrographs (IFS), are composed of two parts: 1) an Integral Field Unit (IFU) that reformats a two-dimensional (2D) spatial field formed by an imaging system such as a telescope or a microscope into long narrow slices or sparsely populated 2D field of light sources, and 2) a conventional grating spectrograph coupled with 2D sensor to record the spectra of all of the field points simultaneously. Three types of IFUs, namely, 1) microlens arrays, 2) coherent fiber optic arrays, and 3) machined or polished glass image slicers are commonly used for the construction of IFSs, each with their advantages and limitations. The optical systems of the spectrographs of conventional IFS are usually large due to the need to support the extended long slit or the large sparsely populated small light sources formed by the IFUs. Due to the large spectrographs, the intrinsic spectral resolution these spectrographs (limited by the illuminated size of the grating) can achieve usually far exceeds the resolution required.

SUMMARY

One or more embodiments are directed to optical components and systems for snapshot hyperspectral imaging in a compact structure.

One or more embodiments are directed to an image slicer for use with a multispectral light source, including a first section having a first plurality of mirrors, each mirror of the first plurality of mirrors having a predetermined tilt in a longitudinal direction, a second section having a second plurality of mirrors, each mirror of the second plurality of mirrors having a predetermined tilt in the longitudinal direction, and a ridge extending laterally between the first section and the second, the first section being at a first angle relative to the ridge and the second section being at a second angle opposite to the first angle relative to the ridge.

Each of the first plurality of mirrors and the second plurality of mirrors may be plane mirrors.

One or more embodiments are directed to an integral field unit for use with a multispectral light source, having a four mirror design, including an image slicer having a plurality of slicer mirrors to receive light from the multispectral light source and output a plurality of diverging light beams, a collimator mirror that collimates each of the plurality of diverging light beams from the plurality of slicer mirrors into a plurality of collimated light beams, a plurality of reimaging mirrors to output an image of each slicer mirror onto an image sensor, and a plurality of folding mirrors that direct the plurality of collimated light beams from the collimator mirror onto the plurality of reimaging mirrors.

The image slicer may include a first section having a first plurality of mirrors each having a predetermined tilt in a longitudinal direction, a second section having a second plurality of mirrors each having a predetermined tilt in the longitudinal direction, and a ridge extending laterally between the first section and the second, the first section being at a first angle relative to the ridge and the second section being at a second angle opposite to the first angle relative to the ridge.

Each of the first plurality of mirrors and the second plurality of mirrors may be plane mirrors.

One or more embodiments are directed to an integral field spectrograph for use with a multispectral light source, including an image slicer including a plurality of slicer mirrors, and an array of spectrographs, each spectrograph associated with a corresponding one of the plurality of slicer mirrors, wherein the array of spectrographs multiplex multispectral data onto a two-dimensional image sensor.

Each spectrograph in the array of spectrographs may include a slicer mirror serving as the entrance slit of the spectrograph, a collimator mirror that collimates a diverging light beam from a corresponding slicer mirror into a collimated light beam, a micro-grating that receives the collimated light beam from the collimator mirror and diffracts light into a plurality of wavelength bands, and a reimaging mirror that directs each of the plurality of wavelength bands onto the two-dimensional image sensor.

Each collimator mirror may be an off-axis parabolic collimator mirror.

Each row of spectrographs in the array of spectrographs may use an integrated row of off-axis parabolic collimator mirrors.

Each row of spectrographs in the array of spectrographs may use an integrated row of micro-gratings.

Each row of spectrographs in the array of spectrographs may use an integrated row of reimaging mirrors.

The array of integral field spectrograph may a four mirror design, including a plurality of slicer mirrors in the image slicer to receive light from the multispectral light source and output a plurality of diverging light beams, a collimator mirror that collimates each of the plurality of diverging light beams from the plurality of slicer mirrors into a plurality of collimated light beams, a plurality of folding mirrors, a plurality of reimaging mirrors to output an image of each slicer mirror onto an image sensor, wherein the plurality of folding mirrors direct the plurality of collimated light beams from the collimator mirror onto the plurality of reimaging mirrors.

The image slicer may include a first section having a first plurality of mirrors, each mirror of the first plurality of mirrors having a predetermined tilt in a longitudinal direction, a second section having a second plurality of mirrors, each mirror of the second plurality of mirrors having a predetermined tilt in the longitudinal direction, and a ridge extending laterally between the first section and the second, the first section being at a first angle relative to the ridge and the second section being at a second angle opposite to the first angle relative to the ridge.

One or more embodiments are directed to a multiplexed integral field spectrograph including a plurality of any of the integral field spectrographs as described above.

The plurality of integral field spectrographs may receive light from a single source and may further include a field divider to divide the light from the single source to be incident onto each of the plurality of integral field spectrographs.

Each of the plurality of integral field spectrographs receive light from a different source.

Each of the plurality of integral field spectrographs may include an array of integral field spectrographs and may further include a field divider to divide the light from each different light source to be incident onto each of the array of integral field spectrographs.

BRIEF DESCRIPTION OF THE DRAWINGS

The scope of the present disclosure is best understood from the following detailed description of exemplary embodiments when read in conjunction with the accompanying drawings.

DETAILED DESCRIPTION

An integral field unit is an optical device that divides a 2D spatial field into a 2D array of image elements (pixels) or long narrow slices and using a reimaging system to reformat the spatial field into a field of sparsely populated point sources or long slits to form the input source, commonly referred to as the 'entrance slit' of diffraction grating spectrograph, for injection into a diffraction spectrograph for use with a multispectral light source.

Figure 1:
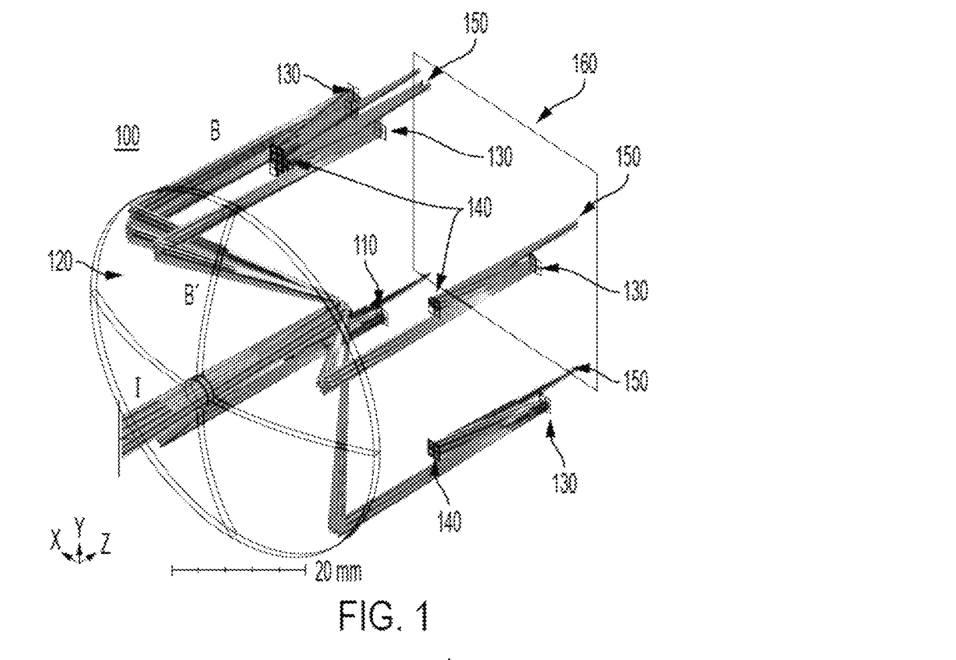
FIG. 1 is a perspective ray trace view and FIG. 2 is a perspective schematic view of a machined image slicer integral field unit (MIST) according to an embodiment.
Figure 2:
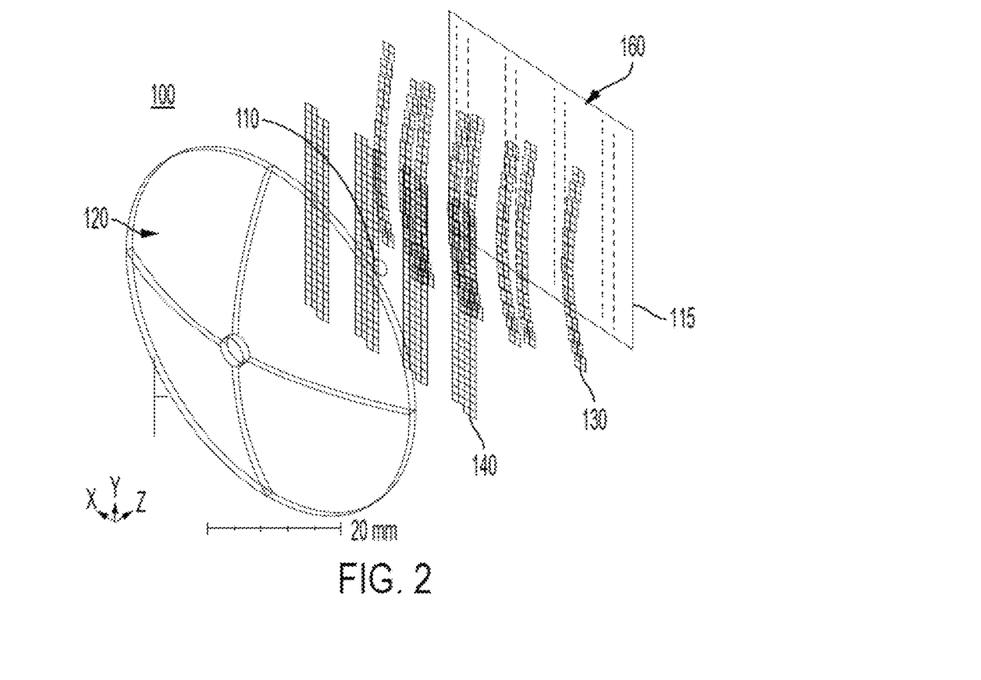

As shown in FIGS. 1 and 2, a machined image slicer integral field unit (MIST) 100 includes a machined image slicer 110, an image slicer 110 that includes a plurality of slicer mirrors 115, a collimator mirror 120, a plurality of fold mirrors 130, a plurality of reimaging mirrors 140, and an exit field stop or array of exit slits, i.e., an exit port 150, having a corresponding plurality of images of slicer mirrors 115, which are then output to a focal plane array 160 at a sensor. Thus, the reimaging system of MISI 100 is a four mirror design, i.e., slicer mirrors 115, fold mirrors 130 between the collimator mirror 120 and the reimaging mirror 140.

The plurality of slicer mirrors 115 in the image slicer 110 reflects an incoming beam I into a plurality of diverging beams B' to the collimator mirror 120, which, in turn, collimates these diverging beams B' into collimated beams B and directs the collimated beams B onto a corresponding one of the fold mirrors 130. Light output from each fold mirror 130 is reflected and focused by a corresponding one of the reimaging mirrors 140 to image each slicer mirror 115 at and through each exit slit 150.

In particular, each of the micro slicer mirror 115 is reimaged to a designated position in the exit port 150 using the collimator mirror 120, e.g., an off-axis parabolic collimator mirror, to collimates the diverging beam from the slicer mirror 115 followed by a corresponding fold mirror 130, e.g., a micro flat fold mirror, and reimaging mirror 140, e.g., a micro spherical mirror, to refocus onto the focal plane array. In particular, each reimaging mirror 140 may be approximately one focal length away from the intermediate pupils for each collimated beam B formed by the parabolic collimator mirror 120, such that the exit beams are effectively telecentric.

Figure 3:
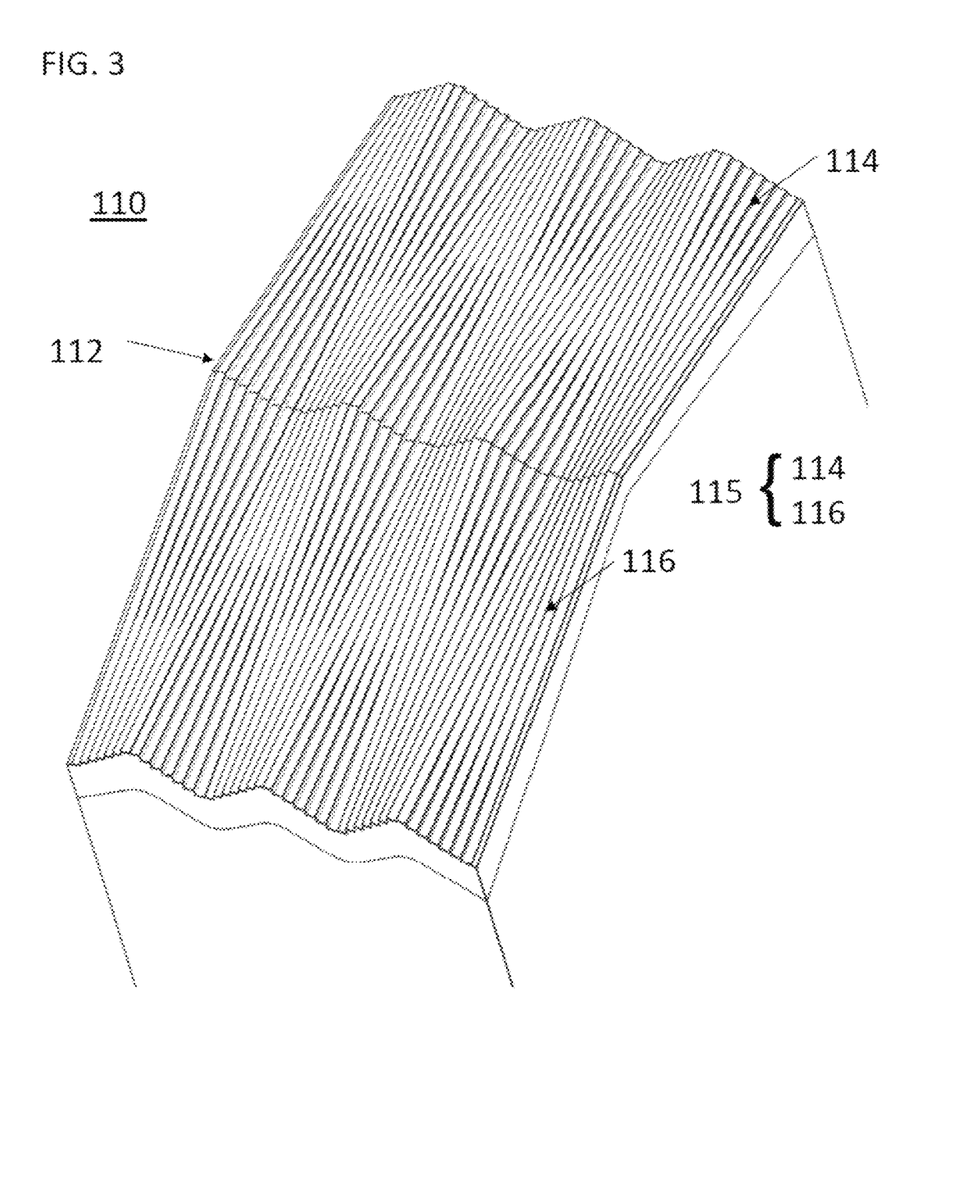
FIG. 3 is a perspective isometric view of an image slicer according to an embodiment.

As may be seen in FIG. 3, the image slicer 110 is divided into two sections defined by a ridge 112. The slicer mirrors 115 include a first plurality of slicer mirrors 114 and a second plurality of slicer mirrors 116 divided by the ridge 112. The first plurality of slicer mirrors 114 have a general tilt angle to direct the beams upward, and the second plurality of slicer mirrors 116 have a general tilt angle in the opposite direction of the general tilt angle of the first plurality of slicer mirror to direct the beam downward. The division of the image slicer into two sections reduce the depth of the valleys each of the section. The valleys of a conventional image slicer, i.e., an image slicer without the ridge, would have to be very deep, rendering the image slicer impractical to manufacture. However, by including the ridge 112, depth of the valleys may be reduced. The ridge 112 allows the image slicer 110 to direct images of the slicer mirrors 116 to different fold mirror 130/reimaging mirror 140 configurations arranged in an array. The particular design of the image slicer 110 depends on the arrangement of these other components of the MISI 100 and uses the ridge 112 to keep the angle small, as well a focal plane size of the sensor.

In a particular example, the image slicer 110 may include 56×2 slicer mirrors, e.g., each with a dimension of 0.036 mm×2.664 mm, to divide the field into a total of 112 subfields (only 6 of which are shown for clarity). The design of the image slicer 110 depends on the downstream configuration and could include additional sections with additional ridge(s).

Figure 4:
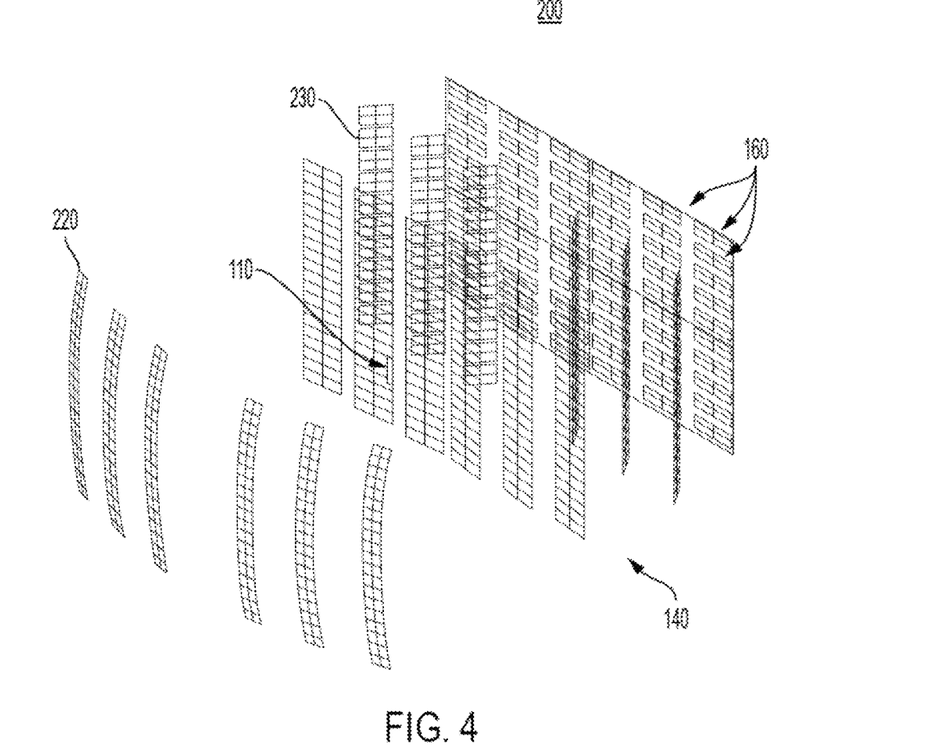
FIG. 4 is a perspective schematic view of a machined image slicer compact spectrograph (MICS) according to an embodiment
Figure 5:
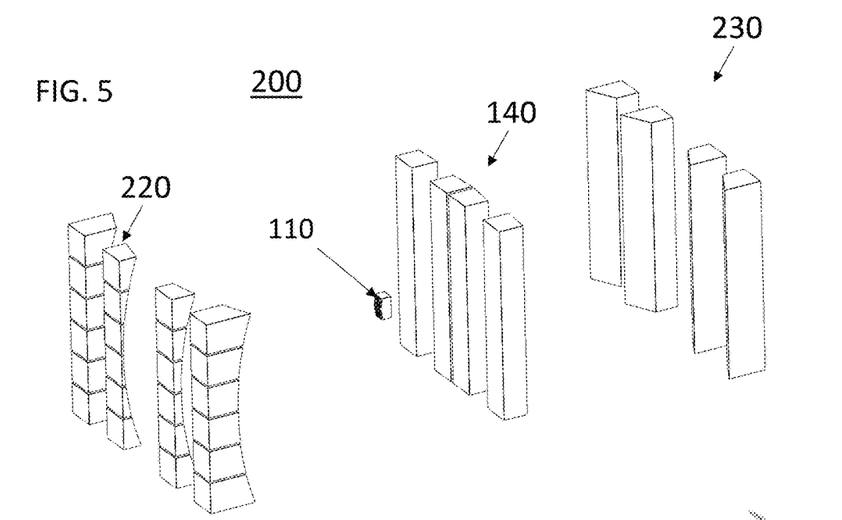
FIG. 5 is a perspective view of the MICS according to an embodiment.
Figure 6:
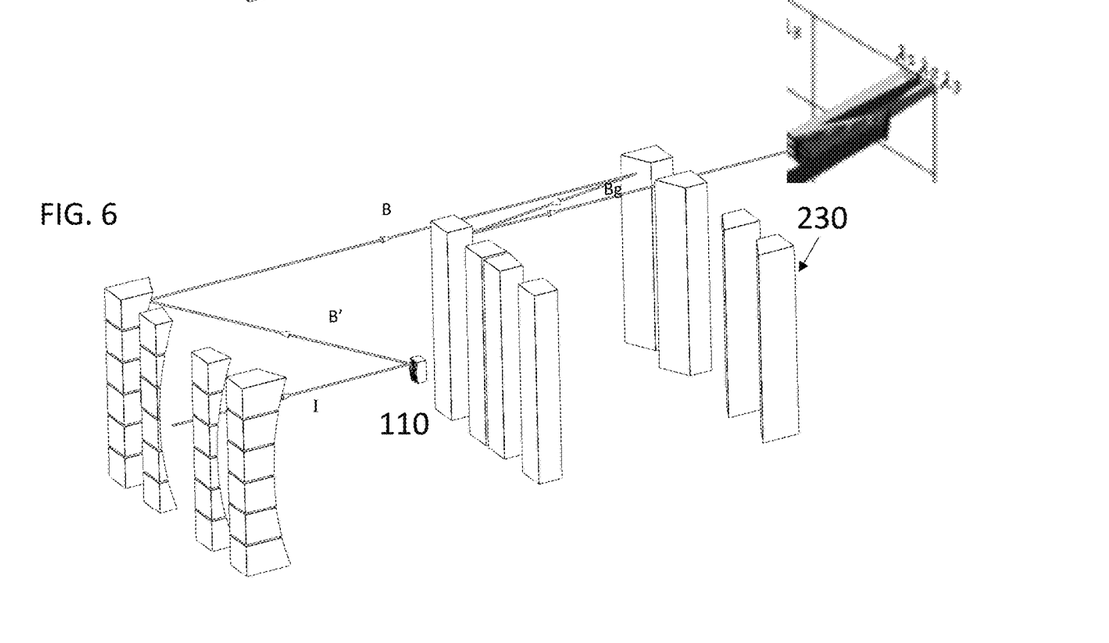
FIG. 6 is a perspective ray trace view of the MICS for the chief ray of a single beam.
Figure 7:
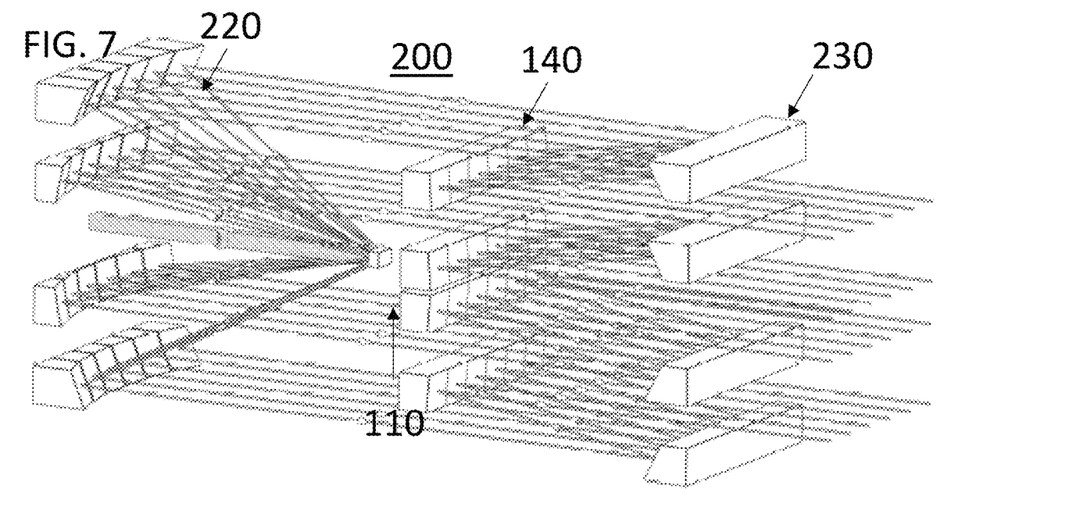
FIGS. 7-9 are different perspective views of the MICS chief rays for all beams.
Figure 8:
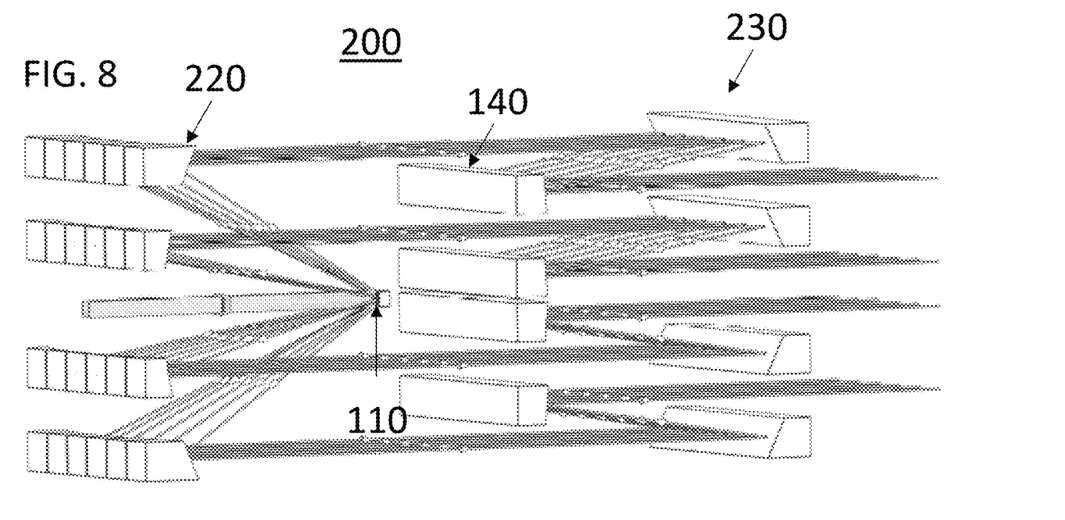
Figure 9:
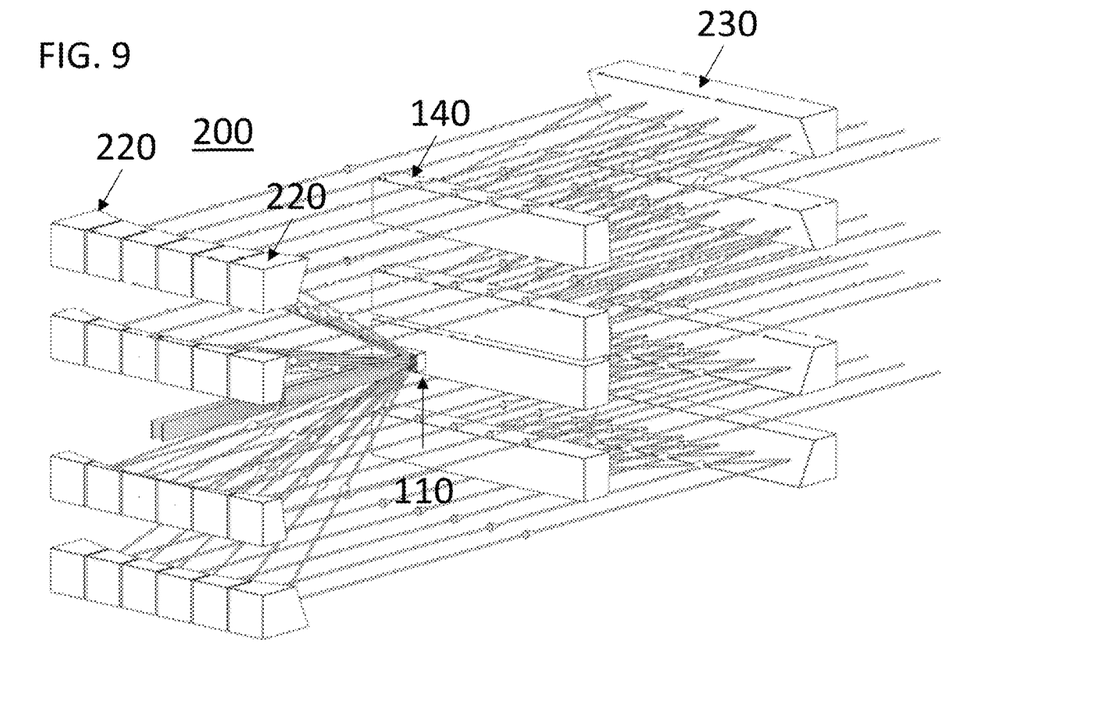
Figure 10:
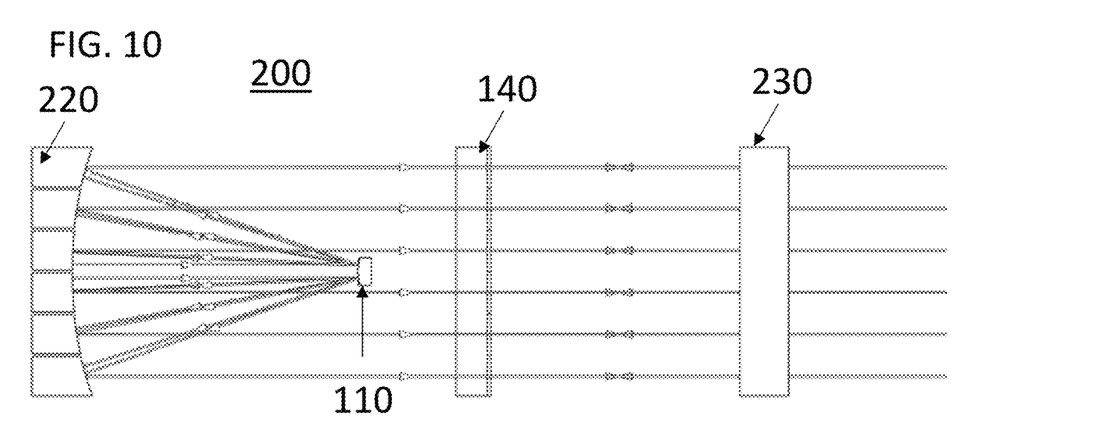
FIG. 10 is a side schematic view of the MICS for all beams.
Figure 11:
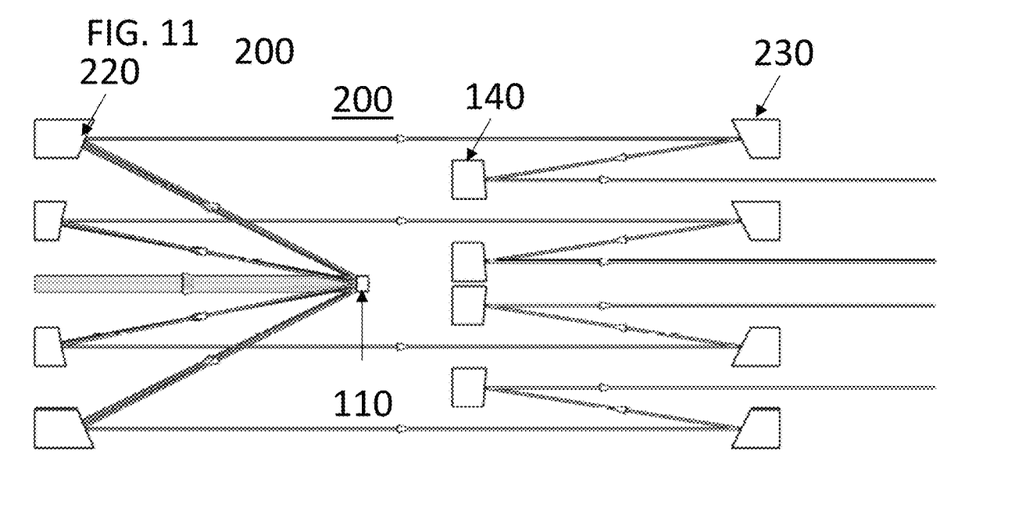
FIG. 11 is a top schematic view of the MICS for all beams.

A machined image slicer compact spectrograph (MICS) 200 according to an embodiment is illustrated in FIGS. 4 to 11. FIGS. 4 and 6 are rotated from the actual configuration which is illustrated in FIGS. 7 to 11 for better visualization of the array. As may be seen therein, the MICS 200 uses the machined image slicer 110 design and the reimaging system of the MISI 100, but replaces the common collimator mirror 120 with individual collimator mirrors and the fold mirrors 130 with gratings. Thus, the integral field unit of the MISI 100 is converted into a mini-spectrograph array of the MICS 200. By incorporating the gratings directly into the integral field unit, the MICS design eliminates the need to have a large, common spectrograph behind the integral field unit, thereby greatly reducing the size of an integral field spectrograph. The following describes optical designs of MICS according to different configurations, one with a single MICS, and one with four MICS to demonstrate the flexibility and scalability of this design.

The MICS 200 includes the image slicer 110 that includes the plurality of slicer mirrors 115, a plurality of off-axis parabolic mirrors (OAPs) 220, a plurality of micro-gratings 230, a plurality of reimaging mirrors 140, and a focal plane array 160. As may be seen in FIG. 4, the plurality of slicer mirrors 115 in the image slicer 110 reflects an incoming beam I into a plurality of diverging beams B' to each of the plurality of OAPs 220, which, in turn, collimate these beams B' into collimated beams B and direct the collimated beams B onto a corresponding one of the gratings 130.

As may be seen in the inset of FIG. 6, the micro-gratings 230 diffract each of the collimated beams B into a plurality of constituent light beams $\lambda_1$ to $\lambda_n$, e.g., three (red, green, blue) for white light, which are then separately focused as beam Bg on the focal plane array 160. Light output from the micro-gratings 230, here, reflective gratings, are reflected by a corresponding reimaging mirror 140 towards the focal plane array 160. Again, the particular design of the image slicer 110 will be dictated by the arrangement of these other components of the MICS 200 as well a focal plane size of the sensor.

Replacing the fold mirrors 130 with gratings 230 converts each of the 4-mirror reimaging system of MISI 100 into a mini spectrograph. Further, while the reimaging system of MISI 100 has a common parabolic collimator mirror 120, which results in a variable reflecting angle between the incident and outgoing beam on the fold mirrors 130, the MICS 200 uses individual off-axis parabolic mirrors 220 with the apex of the parent parabola located at the center of the corresponding slicer mirror to collimate the beam reflected by each of the slicer mirrors 115. This design makes the collimated beams from each of the slicer mirrors 115 to propagate toward each of the corresponding micro grating 230 in parallel to maintain a constant reflection angle (or the spectrograph angle) for all the mini spectrographs. Thus, an individual MICS 200 shown in FIGS. 4 to 10 includes an array of spectrographs, one for each slicer mirror 115 of the image slicer 110.

As may be seen in the particular example shown in FIGS. 4-11, the image slicer 110 may include a 12×2 slicer mirrors, e.g., each 20 μm×0.84 mm in size, forming a 4×6 array of spectrographs, as may be seen most clearly in FIG. 4. All of the mini spectrographs may have an identical grating a angle and spectrograph angle $\psi=\alpha-\beta$, where $\alpha$ is the incident angle of the beam of the micro-gratings 230 with respect to the grating normal and $\beta$ is the exit angle of the diffracted beam with respect to the grating normal. All the micro-gratings may have the same blazing angle. In this particular example, each micro-grating may be grouped as part of a grating 235, each grating 235 containing the 14 micro gratings for the 14 mini spectrographs in the row. Further, as may be seen therein, the individual collimator mirrors 220, the individual gratings 230, and the individual reimaging mirrors 140 may be each be integrated along one direction in the array, here a row direction.

MICS 200 is designed to utilize modern large-format focal plane arrays (FPAs) with large multiplexing capability to obtain high quality spectral information over a 2D field simultaneously in a compact space. Given a FPA with certain physical size and pixel format, the instantaneous spatial and spectral sampling size and the hyperspectral field of view (nx, ny, nλ) can be adjusted depending on the requirements of the measurements. For example, larger size optics can be used to achieve higher spectral resolution. However, this will reduce the number of mini spectrographs that can be accommodated on the sensor and the instantaneous spatial field of view coverage of the IFS. Nevertheless, the compact size of MICS allows multiple MICSs to be used in a single instrument, allowing the field of view to be easily doubled or quadrupled, as illustrated in FIG. 12.

Figure 12:
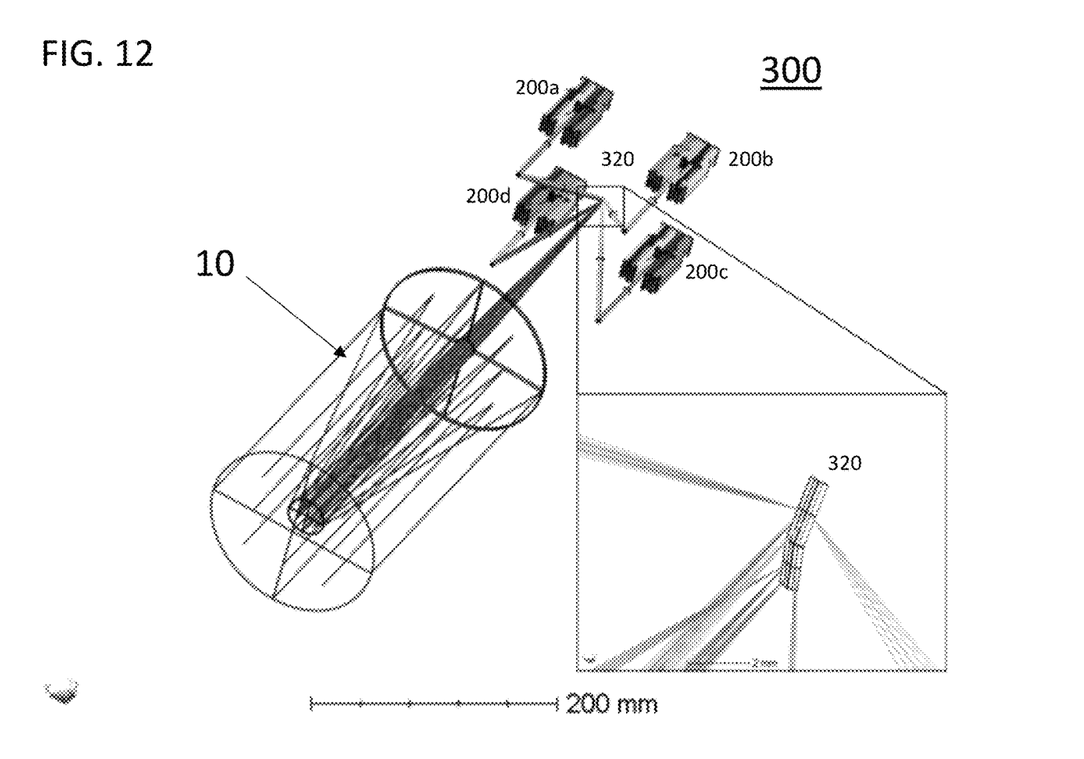
FIG. 12 is a perspective ray trace view of a configuration having four MICS sharing a common light feed according to an embodiment.

FIG. 12 shows an example system 300 including four MICSs 200a to 200d fed by a common source, e.g., a telescope 10. A 2×2 field divider 320 divides the telescope focal plane into four subfields, one for each MICS. The inset in FIG. 12 illustrates details of the field divider 320. Four 2-lens folded relay systems direct the four subfields onto respective ones of the four MICSs 200a to 200d. In this particular example, the telescope field is divided twice, first by the field divider 320 into four sub-fields, and each sub-field divided up by the image slicer in the respective MICSs 200a to 200d. Additional field dividers may be cascaded as needed and additional MICS included. The image slicer 110 of the MICS would be at the focal point of the telescope 10, either directly or through an optical relay.

Figure 13:
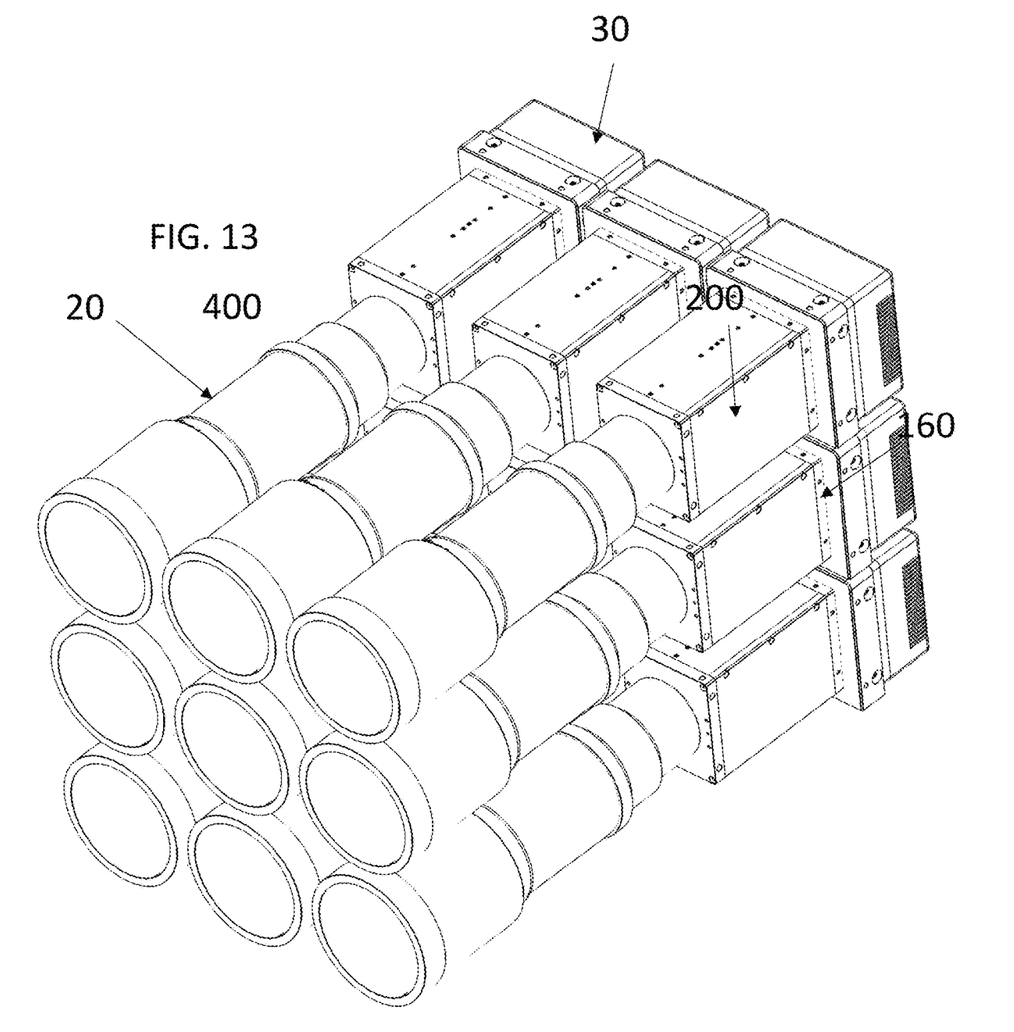
FIG. 13 is a perspective schematic view of a configuration having a plurality of MICS each with dedicated light feed according to an embodiment.

Another way to multiplex to increase the hyperspectral field of view is illustrated in FIG. 13, in which a system 400 includes array of smaller telescopes 20, a corresponding array of MICSs 220 for each telescope 20, and a corresponding array of image sensors 30. Each MICS 220 covers a mosaic field and the mosaic fields of all the MICS are combined together to form the image across the field. Again, the image slicer 110 of the MICS would be at the focal point of each telescope 20, either directly or through an optical relay.

Alternatively, each MICS 200 in the array may include the plurality of MICS 200a to 200d along with a field divider 320 for each telescope 220, i.e., using the system 300 of FIG. 12.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

The scope of the invention is indicated by the appended claims, rather than the foregoing description.

What is claimed is:

1. An image slicer for use with a multispectral light source, the image slicer comprising:
   a first section having a first plurality of mirrors, each mirror of the first plurality of mirrors having a predetermined tilt in a longitudinal direction;
   a second section having a second plurality of mirrors, each mirror of the second plurality of mirrors having a predetermined tilt in the longitudinal direction; and
   a ridge extending laterally between the first section and the second, the first section being at a first angle relative to the ridge and the second section being at a second angle opposite to the first angle relative to the ridge, such that each mirror in the first plurality of mirrors is at the first angle relative to the ridge and such that each mirror in the second plurality of mirrors is at the second angle relative to the ridge.

2. The image slicer as claimed in claim 1, wherein each of the first plurality of mirrors and the second plurality of mirrors are plane mirrors.

3. An integral field unit for use with a multispectral light source, comprising:
   a four mirror design, including
      an image slicer having a plurality of slicer mirrors to receive light from the multispectral light source and output a plurality of diverging light beams, wherein the image slicer includes
      a first section having a first plurality of mirrors each having a predetermined tilt in a longitudinal direction;
      a second section having a second plurality of mirrors each having a predetermined tilt in the longitudinal direction; and
      a ridge extending laterally between the first section and the second, the first section being at a first angle relative to the ridge and the second section being at a second angle opposite to the first angle relative to the ridge, such that each mirror in the first plurality of mirrors is at the first angle relative to the ridge and such that each mirror in the second plurality of mirrors is at the second angle relative to the ridge;
   a collimator mirror that collimates each of the plurality of diverging light beams from the plurality of slicer mirrors into a plurality of collimated light beams;
   a plurality of reimaging mirrors to output an image of each slicer mirror onto an image sensor, and
   a plurality of folding mirrors that direct the plurality of collimated light beams from the collimator mirror onto the plurality of reimaging mirrors.

4. The image slicer as claimed in claim 3, wherein each of the first plurality of mirrors and the second plurality of mirrors are plane mirrors.

5. A multiplexed integral field spectrograph comprising:
   a plurality of compact integral field spectrographs, each compact integral field spectrograph for use with a multispectral light source, each compact integral field spectrograph imaging a different spatial field from other integral field spectrographs, each compact integral field spectrograph including
      an image slicer including a plurality of slicer mirrors; and
      an array of spectrographs, each spectrograph associated with a corresponding one of the plurality of slicer mirrors; and
      a two-dimensional image sensor; and
   the plurality of compact integral field spectrographs multiplexes multispectral data from respective two-dimensional image sensors.

6. The multiplexed integral field spectrograph as claimed in claim 5, wherein each spectrograph in the array of spectrographs of each compact integral field spectrograph includes
   a slicer mirror serving as an entrance slit of the spectrograph;
   a collimator mirror that collimates a diverging light beam from a corresponding slicer mirror into a collimated light beam;
   a micro-grating that receives the collimated light beam from the collimator mirror and diffracts light into a plurality of wavelength bands; and
   a reimaging mirror that directs each of the plurality of wavelength bands onto the two-dimensional image sensor.

7. The multiplexed integral field spectrograph as claimed in claim 6, wherein each collimator mirror is an off-axis parabolic collimator mirror.

8. The multiplexed integral field spectrograph as claimed in claim 6, wherein each row of spectrographs in the array of spectrographs of each compact integral field spectrograph uses an integrated row of off-axis parabolic collimator mirrors.

9. The multiplexed integral field spectrograph as claimed in claim 6, wherein each row of spectrographs in the array of spectrographs of each compact integral field spectrograph uses an integrated row of micro-gratings.

10. The multiplexed integral field spectrograph as claimed in claim 6, wherein each row of miniature spectrographs in the array of spectrographs of each compact integral field spectrograph uses an integrated row of reimaging mirrors.

11. The multiplexed integral field spectrograph as claimed in claim 5, wherein each of the plurality of compact integral field spectrographs includes a four mirror design comprising:
   a plurality of slicer mirrors in the image slicer to receive light from the multispectral light source and output a plurality of diverging light beams;
   a collimator mirror that collimates each of the plurality of diverging light beams from the plurality of slicer mirrors into a plurality of collimated light beams;
   a plurality of folding mirrors; and
   a plurality of reimaging mirrors to output an image of each slicer mirror to each spectrograph of the array of spectrographs, wherein the plurality of folding mirrors direct the plurality of collimated light beams from the collimator mirror onto the plurality of reimaging mirrors.

12. The multiplexed integral field spectrograph as claimed in claim 5, wherein the image slicer of each of the plurality of the compact integral field spectrographs includes:
   a first section having a first plurality of mirrors, each mirror of the first plurality of mirrors having a predetermined tilt in a longitudinal direction;

a second section having a second plurality of mirrors, each mirror of the second plurality of mirrors having a predetermined tilt in the longitudinal direction; and a ridge extending laterally between the first section and the second, the first section being at a first angle relative to the ridge and the second section being at a second angle opposite to the first angle relative to the ridge, such that each mirror in the first plurality of mirrors is at the first angle relative to the ridge and such that each mirror in the second plurality of mirrors is at the second angle relative to the ridge.

13. The multiplexed integral field spectrograph as claimed in claim 5, wherein the plurality of compact integral field spectrographs receive light from a single source and the multiplexed integral field spectrograph further comprising a field divider to divide the light from the single source into different spatial fields to be incident onto each of the plurality of compact integral field spectrographs.

14. The multiplexed integral field spectrograph as claimed in claim 5, wherein each of the plurality of compact integral field spectrographs receive light from a different source.

15. The multiplexed integral field spectrograph as claimed in claim 5, further comprising a field divider to divide the light from each different light source to be incident onto each compact integral field spectrograph of the plurality of compact integral field spectrographs.

\* \* \* \* \*